J.C. & W.F. Curryer,
Clod Fender.
No. 89,470.
Patented Apr. 27, 1869.
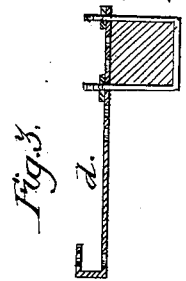
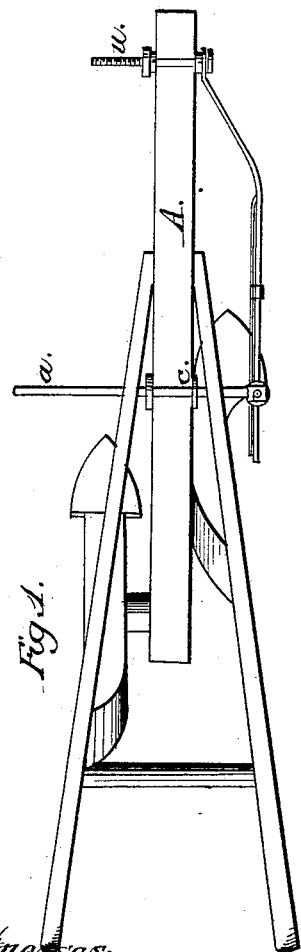
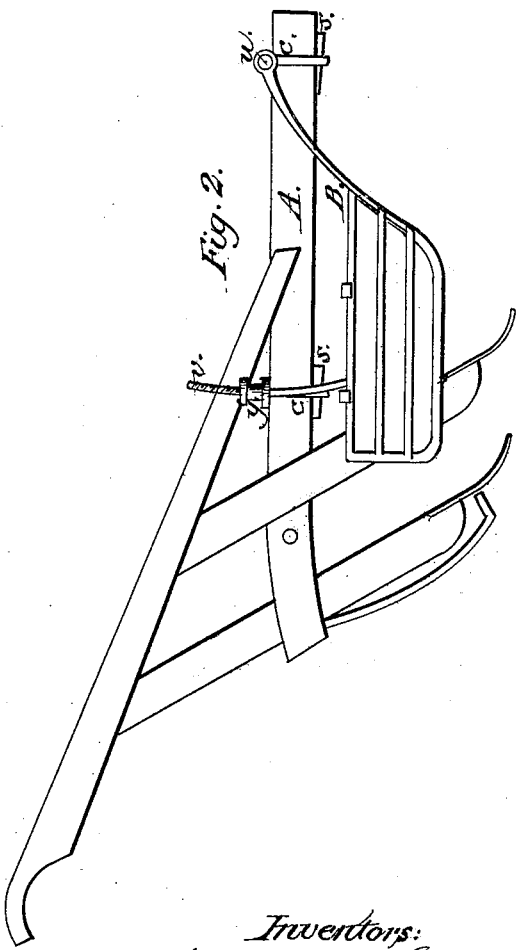
Witnesses:
James P. Crow
Paul J. Weinberger
Inventors:
J.C. & W.F. Curryer
by
Chipman Hosmer & Co.
Attorneys

JOSEPH C. CURRYER AND WILLIAM F. CURRYER, OF THORNTOWN, INDIANA.

Letters Patent No. 89,470, dated April 27, 1869.

IMPROVEMENT IN CLOD-FENDER.

The Schedule referred to in these Letters Patent and making part of the same.

*To all whom it may concern:*

Be it known that we, JOSEPH C. CURRYER and WILLIAM F. CURRYER, of Thorntown, in the county of Boone, and State of Indiana, have invented a new and valuable Improvement in Clod-Fenders; and we do hereby declare that the following is a full, clear, and exact description of the construction and operation of the same, reference being had to the annexed drawings, making a part of this specification, and to the letters and figures of reference marked thereon.

Figure 1, of the drawings, is a representation of a plan view of our device;

Figure 2 is a side view; and

Figure 3 is a detail.

Our invention has relation to clod-fender attachments for plows, used in cultivating between standing rows of corn and other plants, for the purpose of shielding such plants from clods and stones that may be turned over by the plow; and It consists, mainly, in providing better means than have heretofore been used for attaching such fender to a plow-beam, without impairing the strength of such beam.

It also consists in providing novel and efficient means for adjusting the position of such clod-fender inward or outward upon the plow-beam, and of supporting it in the position required.

The letter A, of the drawings, represents a plow-beam, and letter B, the clod-fender, adjusted on the side thereof.

The letters $c$ are staples passing around the plow-beam, and letters $s$ are wedges adjusted between said staples and the plow-beam, in the manner shown.

The letter $u$ is a bolt passing through the forward staple $c$, above the plow-beam, on one end of which we cut a thread, and adjust a nut in the manner represented on fig. 1.

The front end of the clod-fender is attached to the bolt $u$, between its head and the staple, as shown, said bolt serving as a rest and pivot therefor.

The letter $v$ is a rod extending upward from the clod-fender, and which has a thread and nut on its upper end, as shown, and the letter $a$ is a sliding rod that passes through the rear staple $c$, above the plow-beam.

The right-hand end of this sliding rod is provided with a tube, $y$, through which the rod $v$ is passed, and upon the top of which it is made secure by means of the thread and nut last above mentioned.

This tube $y$ serves not only as a rest for the nut on the fender-rod, but also as a guide and support for said rod, and prevents the same from being moved to the right or left by clods or stones.

Fig. 3, of the drawings, represents another method we sometimes use in connecting the rear end of the clod-fender to the plow-beam.

It consists of a flat bar, $d$, having the form of a hook at its left-hand end, as shown on the drawings, and which hook is made to serve as a substitute for the tube $y$, as used in connection with the sliding rod $a$; that is to say, the clod-fender rod $v$ passes through holes in the upper and lower parts of this hook, and is adjusted therein by the thread and nut last above mentioned. We find the device shown on fig. 3 to be cheap and convenient, and recommend its use.

What we claim as our invention, and desire to secure by Letters Patent, is—

The devices herein described and shown, for attaching a clod-fender to a plow-beam, consisting of the staples $c$, wedges $s$, bolt $u$, rods $v$ and $a$, with the tube or hook, as described, when constructed, arranged, and operating substantially as herein specified.

In testimony that we claim the above, we have hereunto subscribed our names, in the presence of two witnesses.

JOSEPH C. CURRYER.
WILLIAM F. CURRYER.

Witnesses:
ABNER V. AUSTIN,
PERRY FELTON.